United States Patent
Condict et al.

(10) Patent No.: US 10,884,622 B2
(45) Date of Patent: Jan. 5, 2021

(54) STORAGE AREA NETWORK HAVING FABRIC-ATTACHED STORAGE DRIVES, SAN AGENT-EXECUTING CLIENT DEVICES, AND SAN MANAGER THAT MANAGES LOGICAL VOLUME WITHOUT HANDLING DATA TRANSFER BETWEEN CLIENT COMPUTING DEVICE AND STORAGE DRIVE THAT PROVIDES DRIVE VOLUME OF THE LOGICAL VOLUME

(71) Applicant: Lenovo Enterprise Solutions (Singapore) PTE. LTD., New Tech Park (SG)

(72) Inventors: Michael Neil Condict, Hurdle Mills, NC (US); David W. Cosby, Raleigh, NC (US); Jonathan Randall Hinkle, Morrisville, NC (US)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 0 days.

(21) Appl. No.: 15/295,596

(22) Filed: Oct. 17, 2016

(65) Prior Publication Data
US 2018/0107409 A1    Apr. 19, 2018

(51) Int. Cl.
  *G06F 3/06* (2006.01)
  *G06F 11/20* (2006.01)
(52) U.S. Cl.
  CPC ............ *G06F 3/0605* (2013.01); *G06F 3/067* (2013.01); *G06F 3/0631* (2013.01); *G06F 3/0665* (2013.01); *G06F 11/2092* (2013.01)

(58) Field of Classification Search
CPC .... G06F 3/0605; G06F 3/0631; G06F 3/0665; G06F 3/067
See application file for complete search history.

(56) References Cited

U.S. PATENT DOCUMENTS

| | | | |
|---|---|---|---|
| 6,151,659 A | 11/2000 | Solomon et al. | |
| 6,889,309 B1 * | 5/2005 | Oliveira | G06F 3/0607 707/E17.01 |
| 7,249,347 B2 | 7/2007 | Chang et al. | |
| 7,251,709 B2 | 7/2007 | Williams | |
| 7,702,906 B1 | 4/2010 | Karr | |
| 9,448,735 B1 | 9/2016 | Proulx et al. | |

(Continued)

OTHER PUBLICATIONS

Brown, K., "Fabric Attached Storage: The Convergence of NAS & SAN", COMNET Washington DC., Jan. 28, 2002, 15 pp.

(Continued)

*Primary Examiner* — Reginald G Bragdon
*Assistant Examiner* — Chie Yew
(74) *Attorney, Agent, or Firm* — Kunzler Bean & Adamson; Bruce R. Needham

(57) ABSTRACT

A storage area network (SAN) includes fabric-attachable storage drives that are each directly connected to a fabric and that operate drive volumes. The SAN includes SAN software agents executed by client computing devices that are directly connected to the fabric. Each SAN software agent operates logical volumes realized by the drive volumes of the storage drives. The SAN includes a SAN manager directly connected to the fabric to manage the drive volumes of the SAN storage drives and to manage the logical volumes that the SAN software agents operate.

20 Claims, 7 Drawing Sheets

(56) References Cited

U.S. PATENT DOCUMENTS

| | | | |
|---|---|---|---|
| 9,727,379 | B1 | 8/2017 | Wilkes et al. |
| 9,983,807 | B1 | 5/2018 | Tylik et al. |
| 10,031,857 | B2 | 7/2018 | Menachem et al. |
| 10,042,721 | B2 | 8/2018 | Condict et al. |
| 10,296,247 | B2 | 5/2019 | Caporale et al. |
| 10,353,602 | B2 | 7/2019 | Caporale et al. |
| 10,355,925 | B2 | 7/2019 | Condict et al. |
| 2001/0019614 | A1 | 9/2001 | Madoukh |
| 2005/0193128 | A1* | 9/2005 | Dawson ............ H04L 67/1097 709/229 |
| 2006/0059253 | A1 | 3/2006 | Goodman et al. |
| 2006/0282636 | A1* | 12/2006 | Yamamoto ........... G06F 3/0617 711/170 |
| 2007/0206224 | A1* | 9/2007 | Nagashima .......... G06F 3/0607 358/1.16 |
| 2008/0201535 | A1* | 8/2008 | Hara .................... G06F 3/0605 711/153 |
| 2011/0022812 | A1 | 1/2011 | Van Der et al. |
| 2012/0102268 | A1 | 4/2012 | Smith et al. |
| 2012/0158806 | A1* | 6/2012 | Snyder ............... H04L 67/1097 707/827 |
| 2012/0233463 | A1 | 9/2012 | Holt et al. |
| 2013/0067187 | A1 | 3/2013 | Moss et al. |
| 2013/0297907 | A1 | 11/2013 | Ki et al. |
| 2015/0149625 | A1 | 5/2015 | Piro, Jr. et al. |
| 2015/0288783 | A1 | 10/2015 | Ma et al. |
| 2016/0004475 | A1* | 1/2016 | Beniyama ............ G06F 3/0605 710/74 |
| 2018/0089099 | A1* | 3/2018 | Raj ....................... G06F 3/0659 |
| 2018/0143776 | A1 | 5/2018 | Caporale et al. |
| 2018/0150244 | A1 | 5/2018 | Caporale et al. |
| 2018/0205603 | A1 | 7/2018 | Condict et al. |
| 2018/0260123 | A1 | 9/2018 | Andresen et al. |

OTHER PUBLICATIONS

Cooke, A., "An Introduction to Scale-Up vs. Scale-Out Storage", Enterprise Storage Guide, online <http://www.enterprisestorageguide.com/introduction-scale-vs-scale-storage>, Mar. 6, 2014, 5 pp.

Wilmsen, M., "Hyper converged vs. traditional SAN/NAS?", Virtual Hike, online <http://virtual-hike.com/hyper-converged-or-a-traditional-sannas/>, Jun. 4, 2015, 2 pp.

U.S. Appl. No. 15/451,718, filed Mar. 7, 2017, 65 pp.
U.S. Appl. No. 15/357,267, filed Nov. 21, 2016, 69 pp.
U.S. Appl. No. 15/365,333, filed Nov. 30, 2016, 68 pp.
U.S. Appl. No. 15/406,299, filed Jan. 13, 2017, 62 pp.
U.S. Appl. No. 15/084,908, filed Mar. 30, 2016, 63 pp.

Crowley, P. "Programmable Peripheral Devices," http://www.cs.wustl.edu/~pcrowley/papers/generals.pdf, dated no later than May 14, 2014.

Hot spare, Wikipedia.com, <https://en.wikipedia.org/wiki/Hot_spare>, last edited Nov. 13, 2015, accessed Jan. 11, 2016, 2 pp.

Rashmi, K.V. et al., "A "Hitchhiker's" Guide to Fast and Efficient Data Reconstruction in Erasure-coded Data Centers", SIGCOMM'14, Aug. 17-22, 2014, Chicago, USA, 12 pp.

Khasymski, A. et al., "Realizing Accelerated Cost-Effective Distributed RAID", Handbook on Data Centers. Springer New York, 2015. 24 pp.

Yu Hu, Xiao et al., "Efficient Implementations of the Sum-Product Algorithm for Decoding LDPC Codes", IBM Research, Zurich Research Laboratory, CH-8803 Ruschlikon, Switzerland, IEEE 2001, 6 pp.

Bryant, C., "HGST Demos Ethernet as a Storage Drive Interface", tom's IT PRO, online <http://www.tomsitpro.com/articles/hgst-10gbps-ethernet-cloud-stor . . . >, 4 pp.

Swartz, K.L., "3PAR Fast RAID: High Performance Without Compromise", 2010, 3PAR Inc., 11 pp.

Introduction to Toshiba Key Value Drive Technology, Toshiba Corporation, May 2015, 13 pp.

Storage Monitoring for HDDs and RAID Controllers, Oracle Storage Monitoring and Zone Management, online <https://docs.oracle.com/cd/E19201-01/820-6410-12/ilom_storagemonitor . . . >, copyright 2010, accessed Jan. 11, 2016, 9 pp.

Armstrong, A., "Toshiba Announces Key Value-Based Technology For Object Storage", online <http://www.storagereview.com/toshiba_announces_key_valuebase . . . >, May 18, 2015, 2 pp.

Whitepaper, Key Value Drive, Toshiba Corporation, May 2015, 10 pp.

U.S. Appl. No. 15/451,718, Office Action, dated Jan. 27, 2020, pp. 1-31.

U.S. Appl. No. 15/451,718, Final Office Action, dated Jul. 31, 2020, pp. 1-42.

* cited by examiner

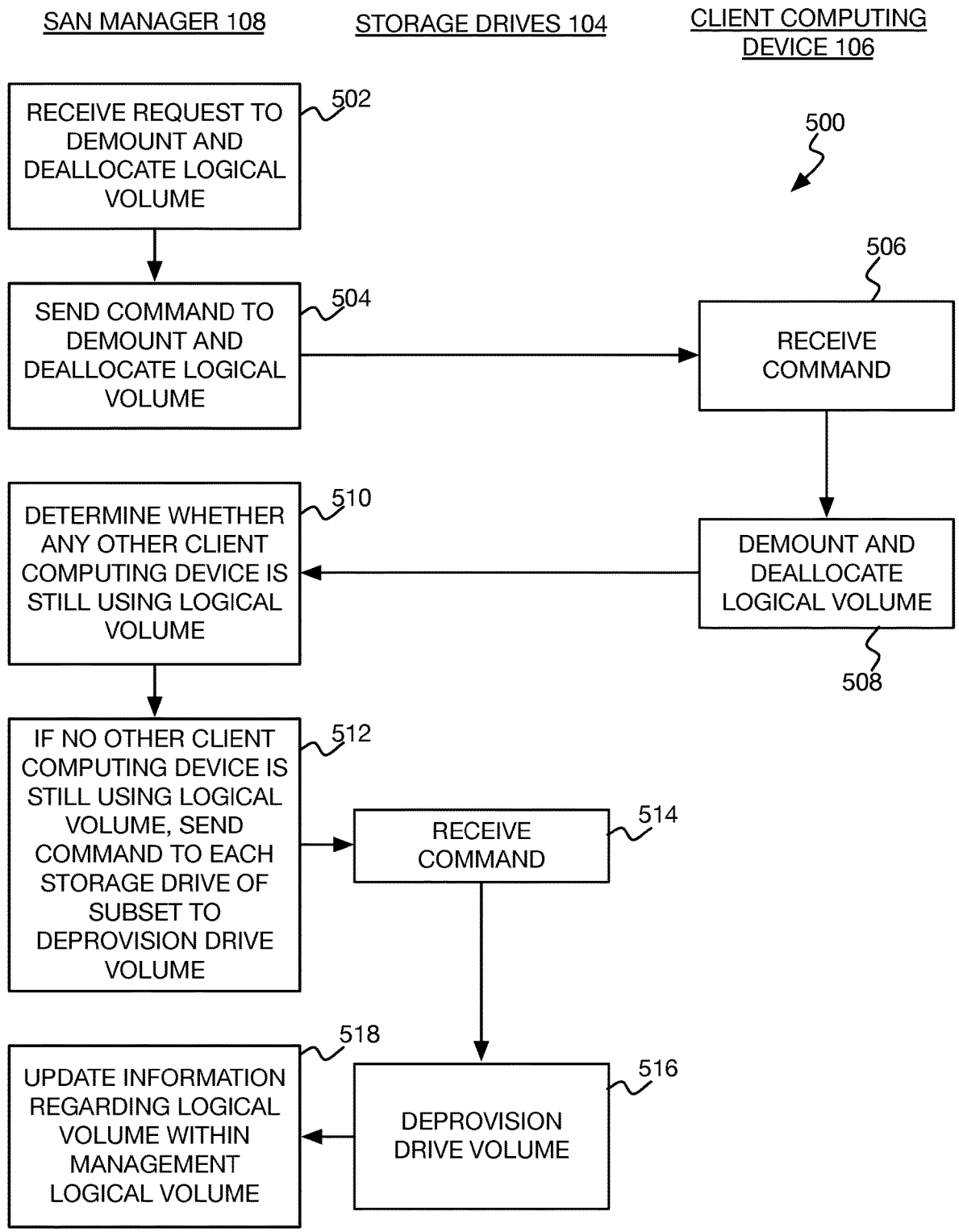

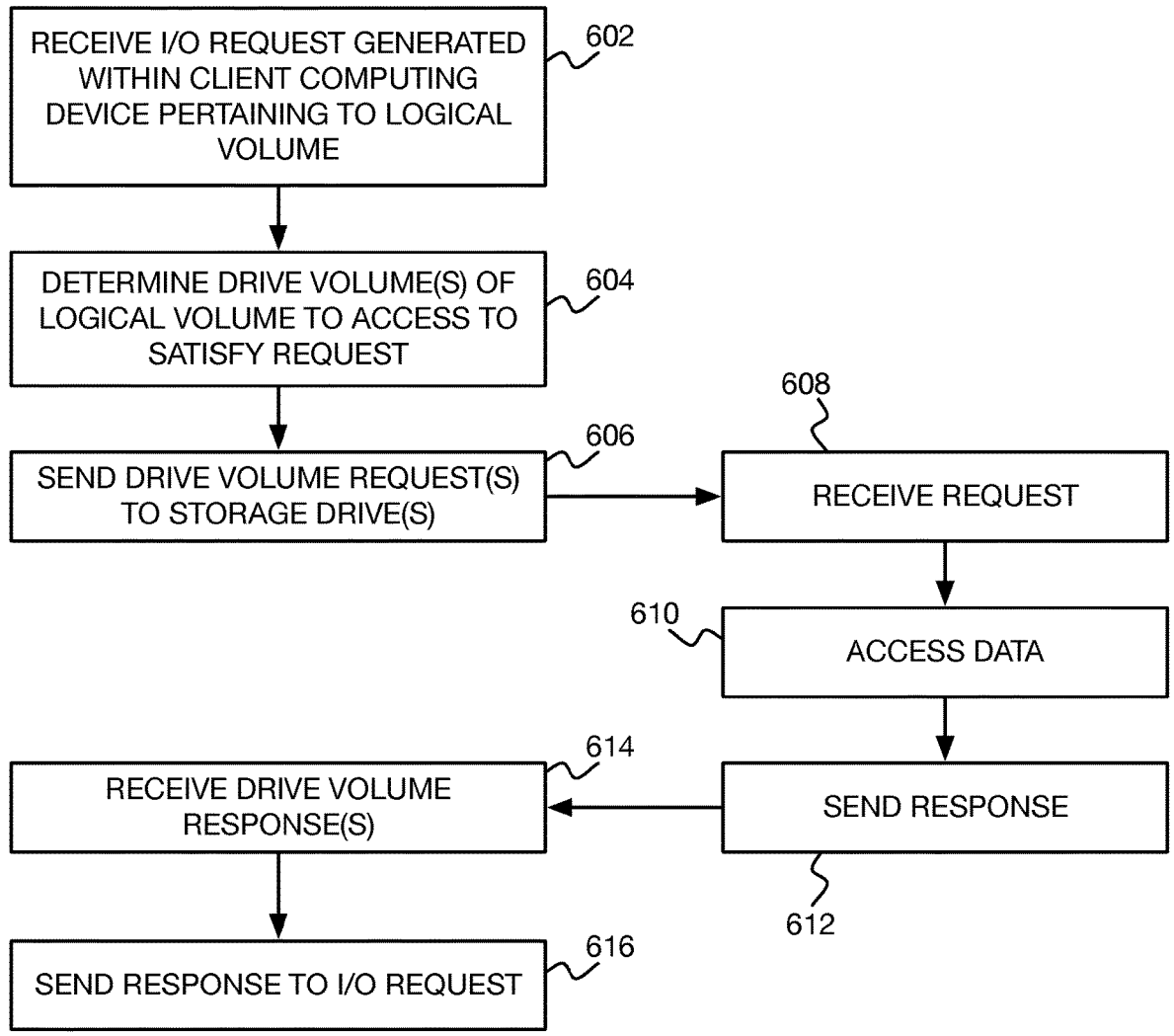

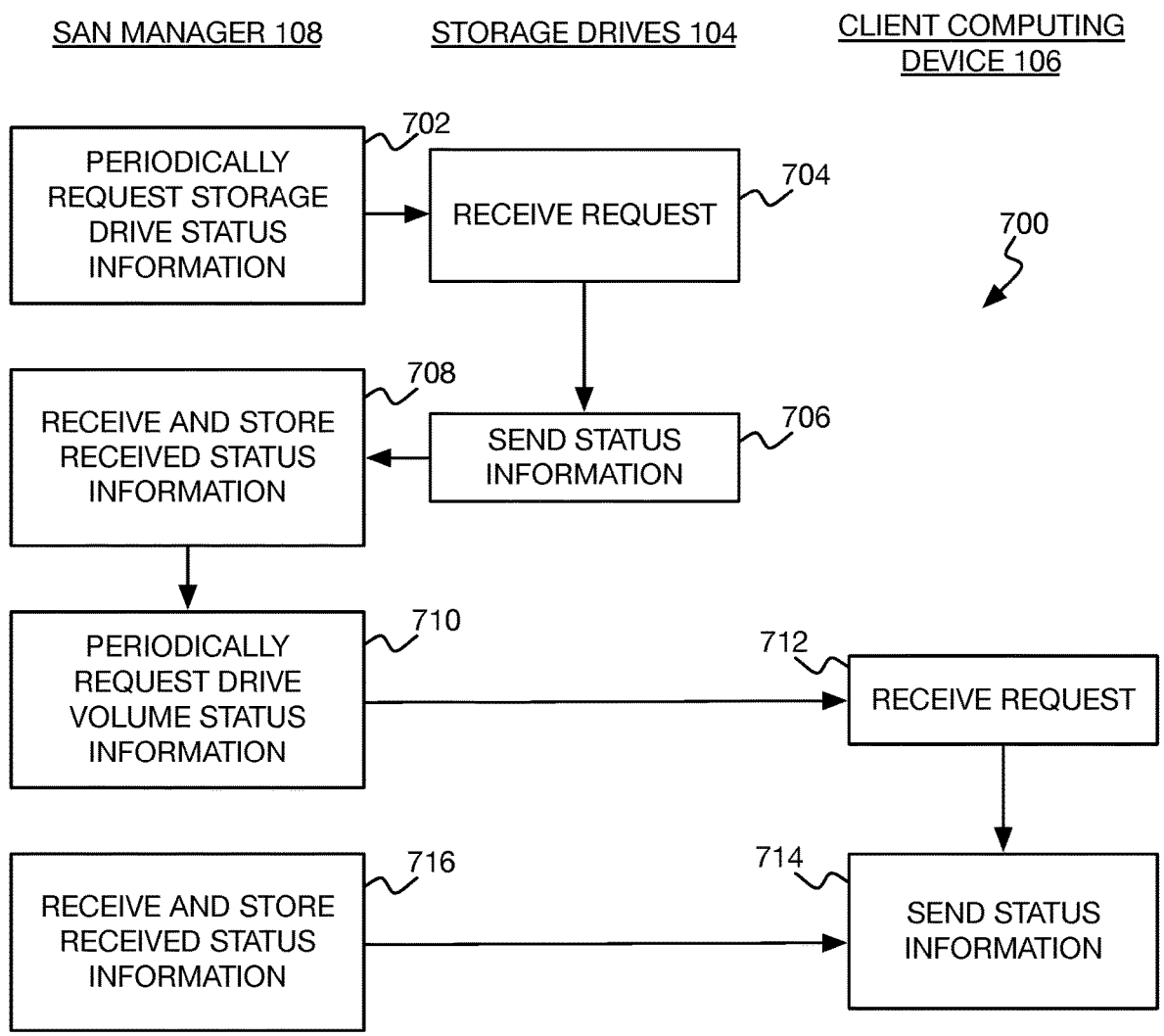

STORAGE AREA NETWORK HAVING FABRIC-ATTACHED STORAGE DRIVES, SAN AGENT-EXECUTING CLIENT DEVICES, AND SAN MANAGER THAT MANAGES LOGICAL VOLUME WITHOUT HANDLING DATA TRANSFER BETWEEN CLIENT COMPUTING DEVICE AND STORAGE DRIVE THAT PROVIDES DRIVE VOLUME OF THE LOGICAL VOLUME

BACKGROUND

Data is the lifeblood of many entities like businesses and governmental organizations, as well as individual users. To store large amounts of data, many enterprises and other organizations rely upon storage-area networks (SANs). A SAN is a network that provides access to consolidated, block-level data storage of a number of different storage drives. The storage is provided as a logical volume, or logical unit number (LUN), which is a virtual storage drive. To a computing device like a server, which is a client computing device within the SAN, the virtual storage drive appears as a locally attached storage drive.

SUMMARY

An example storage-area network (SAN) system includes fabric-attachable storage drives. Each storage drive is directly connected to a fabric and is to operate drive volumes. The SAN system includes client computing devices. Each client computing device is directly connected to the fabric, and is to execute a SAN software agent to operate logical volumes realized by the drive volumes of the storage drives. The SAN system includes a SAN manager directly connected to the fabric to manage the drive volumes of the SAN storage drives and to manage the logical volumes that the SAN software agents of the client computing devices operate.

An example method includes receiving, by a SAN manager running on a computing device directly connected to a fabric, a request from an administrator to allocate and mount a logical volume on a client computing device directly connected to the fabric. The method includes, in response to receiving the request, selecting, by the SAN manager, a subset of storage drives of a set of storage drives to store data of the logical volume. Each storage drive of the set is directly connected to the fabric. The method includes sending, by the SAN manager, a command to each storage drive of the selected subset to provision a drive volume. The method includes sending, by the SAN manager, a command to a SAN software agent on the client computing device to create and mount the logical volume using the drive volumes provisioned on the storage drives of the subset.

An example non-transitory computer-readable data storage medium stores computer-executable code that a client computing device executes to perform a method. The method includes receiving, by a SAN agent running on the client computing device and from a SAN manager directly connected to a fabric to which the client computing device is connected, a command to create and mount a logical volume using one or more drive volumes provisioned on corresponding storage drives directly connected to the fabric. The method includes, in response to receiving the command, creating and mounting, by the SAN agent, the logical volume using the drive volumes provisioned on the storage drives.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 5 is a flowchart of an example method to decommission a logical drive volume from a client computing device of a distributed SAN system that is realized by drive volumes on storage drives of the distributed SAN system.

FIG. 6 is a flowchart of an example method to perform input/output (I/O) requests in relation to a logical drive volume of a client computing device of a distributed SAN system that is realized by drive volumes on storage drives of the distributed SAN system.

FIG. 7 is a flowchart of an example method to maintain a distributed SAN system.

DETAILED DESCRIPTION

Figure 1:
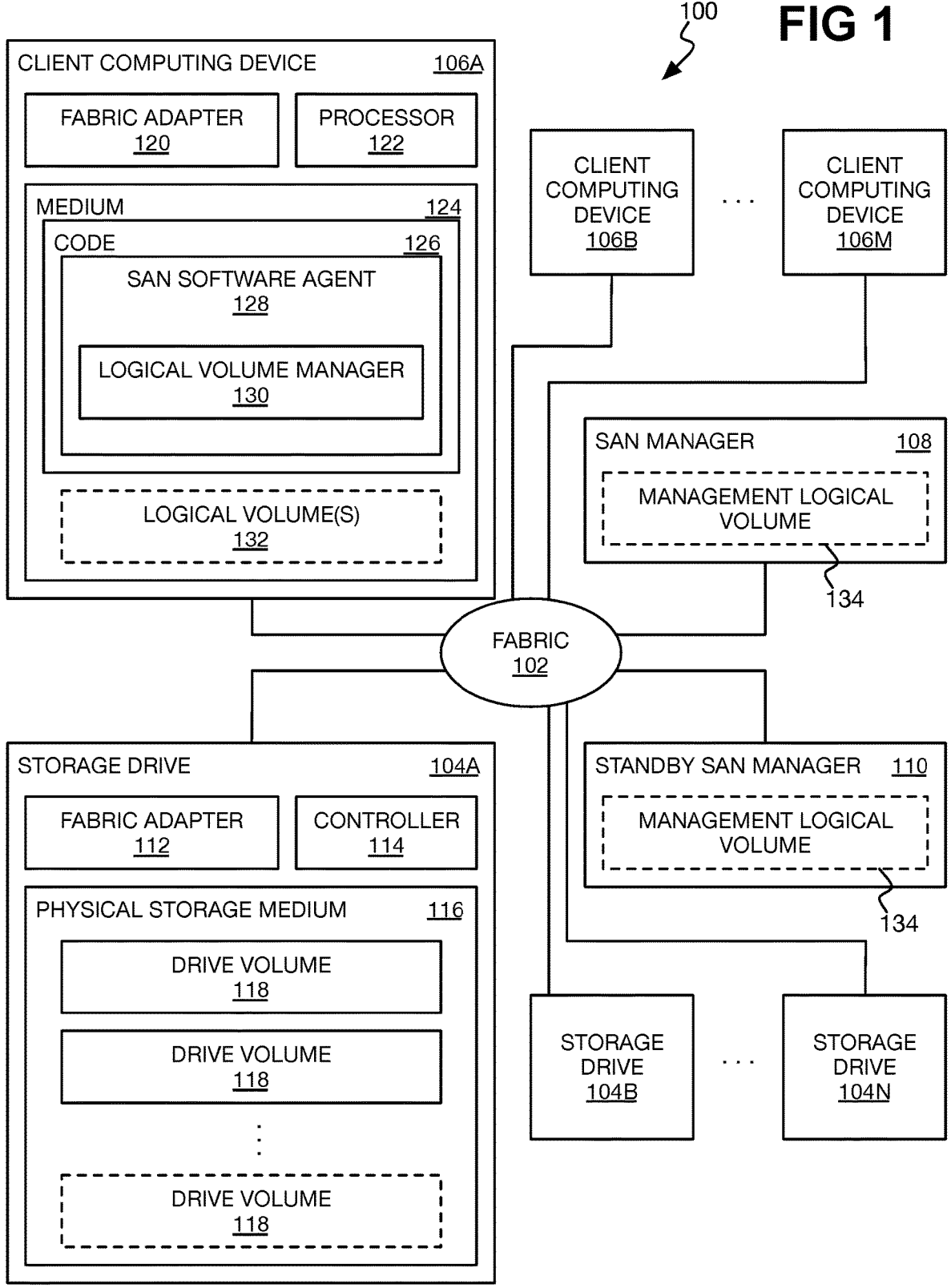
FIG. 1 is a diagram of an example distributed storage-area network (SAN) system.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a SAN is a network by which the physical storage of different storage drives is accessible to client computing devices on a consolidated, block-level basis as virtual storage drives that the client computing devices can treat similarly to locally attached storage drives. A SAN cluster can include a storage controller and multiple storage drives. The storage controller hides the complexity of the underlying implementation of the logical storage drives from the client computing devices. Therefore, features such as fault tolerance via a redundant array of independent disks (RAID), high availability, thin provisioning, transparent migration, snapshotting, and disaster recovery can be provided at the SAN cluster level via the storage controller.

As storage drives such as solid-state drives have increased in performance, different strategies have been employed to realize these performance benefits within SANs. For a particular SAN cluster, a storage controller may be replaced with a higher performance controller. However, even the highest performance controller can become a bottleneck within a SAN having a large number of high performance storage drives and/or within a SAN servicing a large number of client computing devices.

Another strategy is to scale out multiple SAN clusters within a single distributed storage system. The storage controllers of multiple SAN clusters are synchronized with one another, and each client computing device accesses the storage system through a corresponding controller. However, this approach does not linearly scale, due to the storage controller of each added SAN cluster having to synchronize with the storage controller of every existing SAN cluster within the system. Furthermore, the data stored by a client computing device may not be stored in the SAN cluster including the storage controller through which the client computing device accesses the system, adding extra-hop latency to satisfy input/output (I/O) requests from the client computing device.

A third strategy is to employ a hyper-converged approach, in which storage drives are directly attached to a client computing device. The client device effectively acts as a SAN storage controller for the physical storage of these storage drives, providing access to this storage on a consolidated, block-level data basis to the client device itself as well as to other client computing devices. A client computing device runs storage controller software that determines whether data requested within the client device is stored on a locally attached storage drive, satisfying the request itself for locally stored data and forwarding the request to a different client device if the latter locally stores the requested data. The hyper-converged technique is quite complex, though, and while providing for improved scaling, does little to improve overall throughput to the extent that modern solid-state drives can provide.

Disclosed herein are techniques that realize a distributed SAN and which overcome the shortcomings of these and other existing approaches. Such a SAN system includes fabric-attachable storage drives that are each directly connected to a fabric. Client computing devices are also directly connected to the fabric, as is a SAN manager. Each client computing device runs a SAN software agent. The SAN manager manages drive volumes that the storage drives may thinly provision, and further manages logical volumes that the SAN software agents create from the drive volumes. The SAN software agent of a client computing device handles I/O requests generated within the client device for a logical volume, and directly accesses the drive volumes on the storage drives that realize the logical volume, without involving the SAN manager.

As such, management of the drive volumes occurs at the SAN manager level, but allocation and deallocation of the drive volumes occurs at the storage drives themselves under direction of the SAN manager. Similarly, management of the logical volumes occurs at the SAN manager level, but allocation and deallocation of the logical volumes occurs at the client computing devices themselves, by their SAN software agents under direction of the SAN manager. This means that higher-level storage functionality like fault tolerance, high availability, snapshotting, and so on, is achieved by the SAN software agents themselves. I/O access to the drive volumes that make up a logical volume occurs through the SAN software agent of the client computing device at which the I/O access originates.

Such a distributed SAN approach centralizes just the management of drive volumes and logical volumes that are realized by the drive volumes, although a SAN manager itself may be implemented in a distributed manner. The storage drives maintain their own drive volumes, and can even be unaware that they are participating in a SAN and as such may be unaware that there are other storage drives maintaining their own drive volumes. The client computing devices, via their SAN software agents, maintain their own logical volumes, and thus can individually and selectively provide for the higher-level storage functionality desired, if any, although multiple client devices can share (i.e., mount) the same logical volumes.

From the perspective of a storage drive, the storage drive maintains multiple drive volumes that the storage drive thinly provisions. The storage drive allocates and deallocates the drive volumes at the behest of the SAN manager. The storage drive writes data to and retrieves data from its drive volumes at the behest of the SAN software agents of the client computing devices. From the perspective of a client computing device, the SAN storage agent running thereon can maintain multiple logical volumes. The SAN storage agent allocates and deallocates the logical volumes at the behest of the SAN manager, using the drive volumes of the storage drives as the SAN manager directs.

FIG. 1 shows an example distributed SAN system 100. The system 100 includes a fabric 102. The fabric 102 can be a fibre channel fabric, a fibre channel over Ethernet (FCoE) fabric, an Internet small computer system interface (iSCSI) fabric, a serial attached SCSI (SAS) fabric, an InfiniBand fabric, a non-volatile memory Express (NVMe) over Ethernet or fibre channel fabric, or another type of fabric. In general, the fabric 102 is a SAN fabric.

Storage drives 104A, 104B, . . . , 104N, which are collectively referred to as the storage drives 104, are each directly connected to and directly addressable on the fabric 102. Reference to a singular storage drive 104 herein pertains to any of the storage drives 104 individually. Client computing devices 106A, 106B, . . . , 106M, which are collectively referred to as the client computing devices 106, are also each directly connected to the fabric 102. Reference to a singular computing device 106 herein pertains to any of the client computing device 106 individually. There may be more or fewer computing devices 106 than storage drives 104. A SAN manager 108 is directly connected to the fabric 102, and a standby SAN manager 110 may also be directly connected to the fabric 102.

The storage drive 104A is described herein in detail as representative of each storage drive 104. The storage drive 104A includes a fabric adapter 112, which is the hardware that permits the storage drive 104A to directly connect to the fabric 102. The storage drive 104A includes a controller 114, which can be implemented as a general-purpose processor executing code from memory, as an application-specific integrated circuit (ASIC), as a field-programmable gate array (FPGA), or in another manner. The storage drive 104A includes a physical storage medium 116, which is a non-volatile medium, such as a magnetic medium like one or more hard disk drive platters, or semiconductor memory like a number of semiconductor ICs of the type found in a solid-state drive (SSD). The physical storage medium 116, however, may not be a complete hard disk drive or SSD in and of itself.

The controller 114 is able to provision, such as thinly provision, as well as deprovision drive volumes 118 on the physical storage medium 116 responsive to commands that the controller 114 receives over the fabric 102 via the fabric adapter 112. Thin provisioning in particular creates sparse drive volumes 118, and is a manner by which available physical storage space on the storage medium 116 is allocated based on the minimum space required by any drive volume 118 at any time. The drive volumes 118 of the storage drives 104 physically store the data within the SAN system 100 of FIG. 1. Responsive to commands that the controller 114 receives over the fabric 102 via the fabric adapter 112, the controller 114 also is able to access data in relation to the drive volumes 118, including reading, writing, updating, and deleting the data.

The storage drive 104A thus operates the drive volumes 118 thereon, which means that the controller 114 is able to provision and deprovision the drive volumes 118 as well as is able to access data in relation to the drive volumes 118, responsive to commands received over the fabric 102. The storage drive 104A exposes or exports access to the physical storage medium 116 on a storage block-level basis. As such, once a drive volume 118 has been provisioned, access of data in relation to the drive volume 118 occurs on a block-level basis.

An example of a storage drive 104A is an NVMe storage drive that is programmable and exports access thereto via the NVMe over fabrics network protocol. This protocol provides support for allocation and deallocation of namespaces. The namespaces functionally correspond to SCSI LUNs, and thus can be used to implement the drive volumes 118.

Another example of a storage drive 104A is an Ethernet-attached programmable storage drive. A programmable storage drive can be one that lacks a SATA interface or other type of interface that is commonly found in "dumb" disk drives to interface with a bus of a host computing device. Rather, a programmable storage drive may lack any type of external interface to which to connect directly to a bus of a host computing device, and instead may have just the fabric adapter 112 to connect to the fabric 102. In this respect, a programmable storage drive differs from a conventional network-attached storage (NAS), which generally includes therein one or more separate "dumb" disk drives that are connected to a bus, such as a SATA bus, via corresponding interfaces.

The programmability of a programmable storage drive can be used, for instance, to implement an iSCSI target that supports multiple logical unit numbers (LUNs), and network commands to provision and deprovision (i.e., allocate and deallocate) the LUNs. The drive volumes 118 can be implemented as files within a local file system of the programmable storage drive. Such files are thinly provisioned, since storage for blocks of files is not allocated until a file block is written. A programmable storage drive that runs the Linux operating system, for instance, can implement a Linux-I/O target (LIO) SCSI target to achieve this.

A third example of a storage drive 104A is an enclosure that contains one or more non-programmable storage drives. The enclosure can include firmware or software that permits access over the fabric 102 to the each non-programmable storage drive individually, in a "just a bunch of drives" (JBOD) manner. For example, the non-programmable storage drives may be NVMe drives, with the firmware or software of the enclosure implementing the NVMe over fabrics protocol, so that each NVMe drive is separately exposed on the fabric 102.

A fourth example of a storage drive 104A is a hyper-converged computing device. The physical storage of the storage drives locally attached to the computing device is used within the computing device itself. However, the computing device also exports access to the physical storage, such as via iSCSI, via the NVMe over fabrics protocol, or in another manner.

The client computing device 106A is described herein in detail as representative of each client computing device 106. The client computing device 106A can be a server computing device or system, and is considered a client computing device in that within the SAN of FIG. 1, it is a client of the (host) storage drives 104 that store data on physical storage media 116. The client computing device 106A includes a fabric adapter 120, which is hardware that permits the computing device 106A to directly connect to the fabric 102. The client computing device 106A includes a processor 122, such as a general-purpose processor, and a non-transitory computer-readable data storage medium 124, which may include volatile and/or non-volatile such media. The processor 122 executes computer-executable code 126 from the medium 124.

The computer-executable code includes a SAN software agent 128 that operates in relation to logical volumes 132. The SAN software agent 128 can include a logical volume manager 130. The logical volume manager 130 can be part of an operating system running on the client computing device 106A, and is a software component that can allocate, deallocate, resize, and perform other functionality in relation to logical volumes 132. The logical volume manager 130 can alone or in conjunction with other parts of the operating system implement higher-level storage functionality in relation to the logical volumes 132, such as redundancy and fault tolerance like RAID, high availability, snapshotting, deduplication, compression, encryption, mirroring, and so on.

The SAN software agent 128 interacts with the logical volume manager 130 to realize the logical volumes 132 on the drive volumes 118 of the storage drives 104. The SAN software agent 128 may be integrated within the operating system running on the client computing device 106A. The SAN software agent 128 receives commands over the fabric 102 to commission (and decommission) logical volumes 132 using specified drive volumes 118 on the storage drives 104. In response to such commands, the SAN software agent 128 controls the logical volume manager 130 to effectuate the logical volumes 132 at the client computing device 106A.

The SAN software agent 128 likewise controls the logical volume manager 130 or other component(s) of the operating system to effectuate higher-level storage functionality that the logical volumes 132 should have. For example, a logical volume 132 may be specified as a RAID volume realized by five drive volumes 118 of five different storage drives 104. The SAN software agent 128 thus controls the logical volume manager (or other component(s) of the operating system) to create a logical volume 132 at the client computing device 106A that achieves such RAID using the drive volumes 118 in question.

In response to access of the logical volumes 132 at the client computing device 106A, such as via I/O requests to read data from or write data to the logical volumes 132 generated by applications running on the computing device 106A, the SAN software agent 128 (such as the logical volume manager 130 thereof) sends commands over the fabric 102 to the appropriate storage drives 104, based on the configuration of the logical volumes 132 via the logical volume manager 130. The SAN software agent 128 thus handles I/O requests pertaining to data between the client computing device 106A and the storage drives 104. In effect, the SAN software agent 128 is a portion of a SAN controller, but just in relation to the logical volumes 132 allocated at the client computing device 106A. The SAN software agent 128 does not perform SAN controller functionality for any client computing device 106 other than the client computing device 106A of which it is a part.

The logical volumes 132 are depicted by dashed lines in FIG. 1 to indicate that while they are logically defined at the client computing device 106A, the underlying physical storage of the logical volumes 132 does not reside at the client computing device 106A. Rather, each logical volume 132 is physically implemented on one or more the physical storage media 116 of one or more storage drives 104. More specifically, each logical volume 132 is implemented by one or more drive volumes 118 of one or more storage drives 104. However, the SAN software agent 128 does not provision or deprovision the drive volumes 118, but rather receives commands over the fabric 102 instructing the agent 128 which logical volumes 132 to commission, and which drive volume 118 of which storage drives 104 to employ in doing so.

The SAN manager 108 is a node of the SAN that can be its own computing device, similar to one of the computing devices 106. As such, the SAN manager 108 can be software and hardware. The SAN manager 108 can also be software that runs on one of the client computing devices 106, or even one of the storage drives 104 if the processing capability of the storage drive 104 in question is sufficient. The SAN manager 108 generally manages the drive volumes 118 allocated on the storage drives 104, as well as the logical volumes 132 allocated on the client computing devices 106 that are realized by the drive volumes 118. The SAN manager 108, however, does not effect data transfer between the client computing devices 106 and the drive volumes 118 of the storage drives 104 that implement the logical volumes 132 of the client computing devices 106; rather, the SAN software agents 126 do.

The SAN manager 108 thus issues commands to the storage drives 104 to provision and deprovision the drive volumes 118 thereon. The SAN manager 108 similarly issues commands to the SAN software agents 128 of the client computing devices 106 to commission and decommission the logical volumes 132 thereon using specified drive volumes 118 of the storage drives 104. Because the SAN manager 108 is not responsible for data transfer between the client computing devices 106 and the storage drives 104 having the drive volumes 118 implementing the logical volumes 132 of the client computing devices 106, the SAN manager 108 may further periodically request status information from the storage drives 104 and the client computing devices 106. The SAN manager 108 request status information from the storage drives 104 regarding their drive volumes 118, and from the SAN software agents 128 of the client computing devices 106 regarding their logical volumes 132. The SAN manager 108 cannot glean such status information from the data transferred between the client computing devices 106 and the storage drives 104, since it is not responsible for such data transfer, in contradistinction to a conventional SAN controller that is responsible for both volume management and data transfer.

The SAN manager 108 can maintain its own management logical volume 134 that is realized by one or more drive volumes 118 of one or more storage drives 104, similar to the logical volumes 132 that the SAN manager 108 manages on the client computing devices 106. In this respect, the SAN manager 108 is also a client to the (host) storage drives 104, because data of the management logical volume 134 is stored on one or more physical storage media 116 of one or more storage drives 104. The SAN manager 108 can store on the management logical volume 134 which drive volumes 118 have been provisioned on which storage drives 104, as well as other information regarding the drive volumes 118 and/or the storage drives 104. The SAN manager 108 can likewise store on the management logical volume 134 which logical volumes 132 have been commissioned on which client computing devices 106, and which drive volumes 118 of which storage drives 104 implement these logical volumes 132. The SAN manager can store other information regarding the logical volumes 132 and/or the client computing devices 106 on the management logical volume 134, too.

The management logical volume 134 is referred to as a "management" logical volume 134 just to distinguish it from the logical volumes 132 of the client computing devices 106. The SAN manager 108 may employ a management logical volume 134 that uses one or more physical storage media 116 of one or more storage drives 104 instead of its own locally attached storage for failover purposes. For instance, a standby SAN manager 110, running on a different physical computing device than the (primary) SAN manager 108 does, may take over for the SAN manager 108 should the SAN manager 108 fail. The SAN manager 110 may have previously mounted the same management logical volume 134, or may mount the management logical volume 134 at the time of failover from the SAN manager 108 to the standby SAN manager 110. The SAN manager 110 thus has access to the information that the SAN manager 108 previously stored, and can take over for the SAN manager 108. For instance, the SAN manager 110 may periodically send heartbeat requests to the SAN manager 108, and take over for the manager 108 should the SAN manager 108 fail to respond to one or more such requests.

Figure 2:
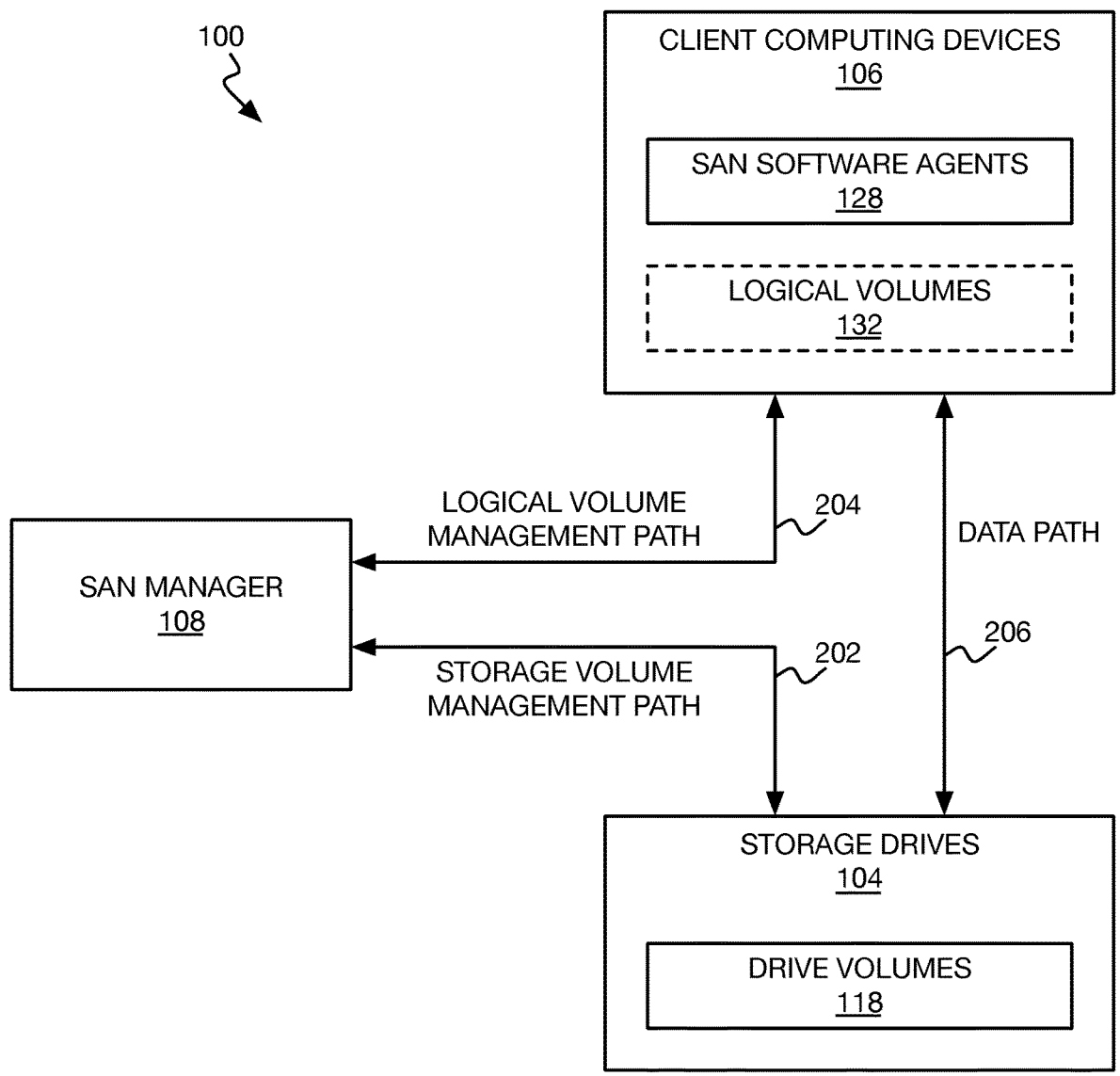
FIG. 2 is a diagram of the demarcation between control and data paths within an example distributed SAN system.

FIG. 2 shows how the example SAN system 100 is a distributed SAN system. The SAN manager 108 manages the drive volumes 118 on the storage drives 104, such that there is effectively a drive volume management path 202 between the SAN manager 108 and the storage drives 104. Each storage drive 104 can be said to operate just the drive volumes 118 physically stored on the storage drive 104. A storage drive 104 operates its drive volumes 108 by provisioning the drive volumes 108 as commissioned by the SAN manger 108 and by deprovisioning them as decommissioned by the SAN manager 108. A storage drive 104 may not be aware that there are other storage drives 104 within the SAN system 100, and/or may not be aware that the drive volumes 118 that it has provisioned is participating with drive volumes 118 of one or more other storage drives 104 to realize a logical volume 132 of a client computing device 106.

The SAN manager 108 manages the logical volumes 132 on the client computing devices 106 via the SAN software agents running on the computing devices 106, such that there is effectively a logical volume management path 204 between the SAN manager 108 and the SAN software agents 128 of the client computing devices 106. The SAN software agent 128 of each client computing device 106 can be said to operate just the logical volumes 132 thereof. The SAN software agent 128 of a client computing device 106 operates its logical volumes 134 by commissioning or allocating the logical volumes 132 using the drive volumes on the storage drives 104 as directed by the SAN manager 108, and by decommissioning or deallocating the logical volumes 132 as directed by the SAN manager 108. The SAN software agent 128 of a client computing device 106 may not be aware that there are other SAN software agents of other client computing devices 106 within the SAN system 100.

I/O access between the client computing devices 106 and the storage drives 104 to access the data of the logical volumes 132 physically stored on the drive volumes 118 occurs directly by the SAN software agents 128 of the client computing devices 106 (such by the logical volume managers 130 thereof) and does not involve the SAN manager 108. As such, there is effectively a data path 206 between the SAN software agents 128 of the client computing devices 106 and the storage drives 104. In this respect, it is noted that when the SAN manager 108 instructs the SAN software agent 128 of a client computing device 106 to commission a logical volume 132 using one or more specific drive volumes 118 of one or more specific storage drives 104, the software agent 128 does not itself provision (or subsequently deprovision) the drive volumes 118 on the storage drives 104. Rather, the SAN manager 108 does, and then instructs the SAN software agent 128 as to which drive volumes 118 on which storage drives 104 to subsequently use when accessing data of the logical volume 132 that the software agent 128 has been instructed to commission.

The SAN software agent 128 of each client computing device 106 is thus to operate the logical volumes 132 realized by the drive volumes 118 of the storage drives 104 by directly accessing the drive volumes 118 responsive to I/O requests generated within the client computing device 106. Likewise, each storage drive 104 is to operate the drive volumes 118 thereof by directly responding to access of its drive volumes 118 by the SAN software agents 128 of the client computing devices 106. Each storage drive 104 operates just its own drive volumes 118, and not those of other storage drives 104. The SAN software agent 128 of each client computing device 106 operates the logical volumes 132 thereof, and not those of other client computing devices 106.

Therefore, the SAN system 100 is a distributed SAN system in at least the following ways. First, SAN controller functionality is divided between the SAN manager 108 and the SAN software agents 128. The SAN manager 108 handles just management of both logical volumes 132 of the client computing devices 106 and drive volumes 118 of the storage drives 104, and does not handle data transfer between the client computing devices 106 and the storage drives 104, which instead the SAN software agents 128 do. Likewise, the SAN software agents 128 handle just data transfer between their client computing devices 106 and the storage drives 104, and do not handle management of their logical volumes 132 or the drive volumes of the storage drives 104, which instead the SAN manager 108 does.

Second, as such, higher-level storage functionality is implemented and handled at the client computing devices 106, such as by their SAN software agents 128, and not by the SAN manager 108 or by or at the storage drives 104. Therefore, a higher performance computing device on which to run the SAN manager 108 is unnecessary to add performance to the SAN storage system 100. Rather, performance capability is effectively added as client computing devices 106 are added to the SAN storage system 100, where a client computing device 106 is to have the performance capability that the computing device 106 needs to achieve the desired higher-level storage functionality.

Third, the storage drives 104 are individually directly connected to the fabric to which the SAN manager 108 and the client computing devices 106 are also directly connected. Therefore, additional storage capacity can be easily and cost-effectively added to the SAN system 100 by directly connecting additional fabric-addressable storage drives 104 to the fabric. Adding storage capacity to the distributed SAN system 100 is divorced from adding performance capability to the SAN system 100. If the performance capability of each client computing device 106 is sufficient, then storage capacity can be added by directly connecting more fabric-addressable storage drives 104 without adding performance capability within the SAN system 100 (such as via adding one or more client computing devices 106). If storage capacity of the storage drives 104 together is sufficient to accommodate an additional client computing device 106, then the client computing device 106 can be added by directly connecting the computing device 106 and just ensuring that the client computing device 106 has sufficient performance to implement the desired higher-level storage functionality.

Figure 3:
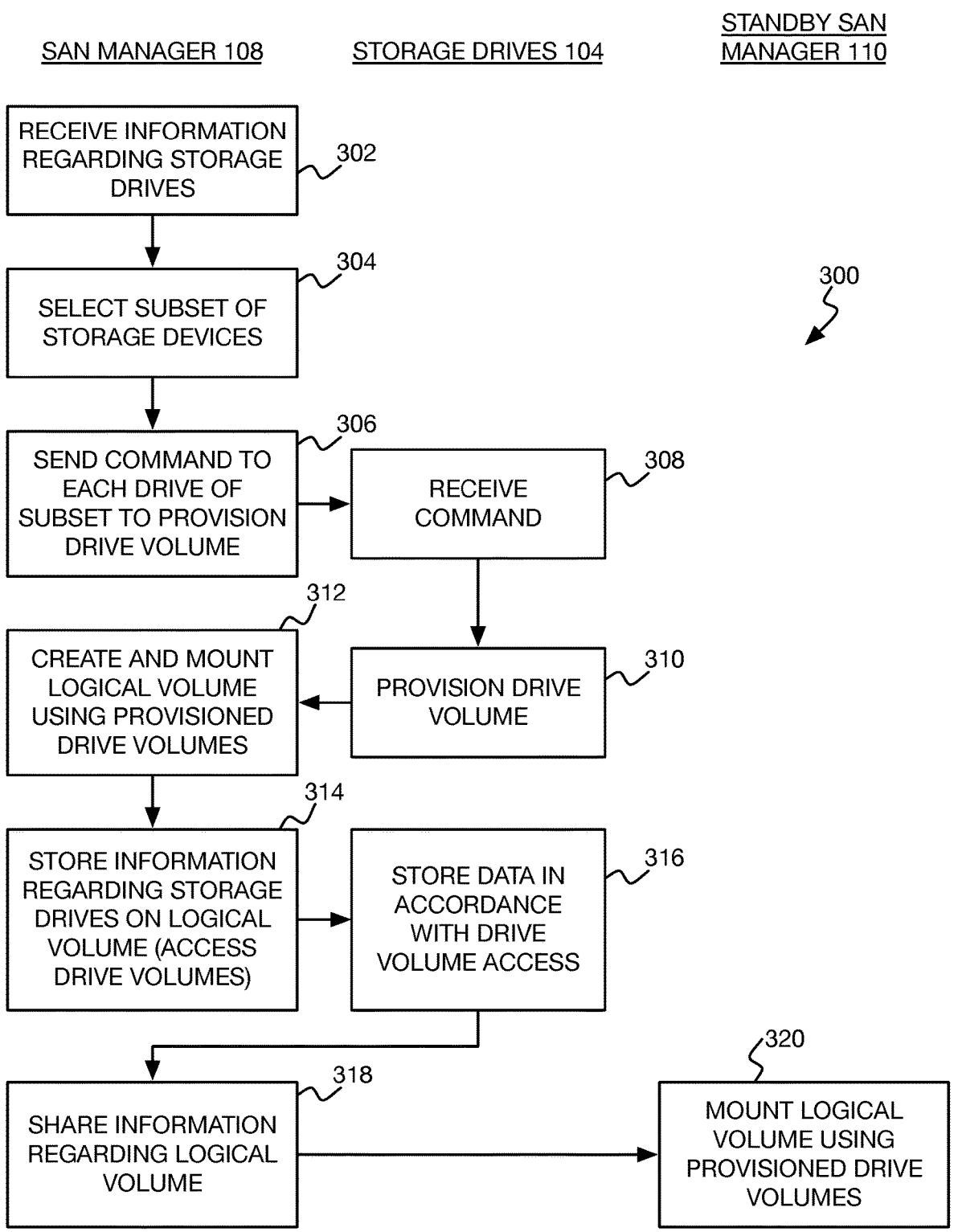
FIG. 3 is a flowchart of an example method to prepare a distributed SAN system having one or more managers.

FIG. 3 shows an example method 300 for preparing the SAN system 100 for subsequent use by the client computing devices 106 of FIG. 1. The method 300 is divided into three columns corresponding to the SAN manager 108, the storage drives 104, and the standby SAN manager 110. The SAN manager 108 performs the parts of the method 300 in the left column; the storage drives 104 perform the parts of the method 300 in the middle column; and the standby SAN manager 110 performs the parts of the method 300 in the right column.

The example of FIG. 3 thus considers the scenario in which there is both a SAN manager 108 and a standby SAN manager 110. However, if failover is not desired, then the standby SAN manager 110 does not have to be present. The SAN manager 108 and the standby SAN manager 110 are each executed on different computing devices. As noted above, the computing devices on which the SAN managers 108 and 110 are executed can be computing devices separate from the client computing devices 106 and the storage drives 104, but in one implementation can each run on a client computing device 106 or a storage drive 104.

The SAN manager 108 receives information regarding the storage drives 104 currently connected to the fabric 102 (302). For example, the SAN manager 108 may expose a web interface by which an administrator logs onto the SAN manager 108 via a different computing device over a network to provide this information. The SAN manager 108 may provide for direct local control by the administrator, such as by a directly connected display device and an input device. In one implementation, the SAN manager 108 may be able to identify the available storage drives 104 without having an administrator provide such information. For instance, the SAN manager 108 may perform a storage drive discovery request to locate each storage drive 104 that is connected to the fabric 102. The information regarding each storage drive 104 that the SAN manager 108 receives can include its address on the fabric 102, its capacity, performance characteristics, and storage medium type, such as whether it is an SDD or a hard disk drive (HDD).

The SAN manager 108 selects a subset of the storage drives 104 on which to provision management drive volumes for implementing a management logical volume (304). The SAN manager 108 may perform this selection with assistance by the administrator or without interaction from the administrator. For example, the SAN manager 108 may default to selecting two storage drives 104 in a random or other manner to achieve a mirroring topology for the management logical volume, or to selecting five or other number of the storage drives 104 in a random or other minor for a RAID topology for the management logical volume. If no redundancy is desired, the SAN manager may just select one storage drive 104.

The SAN manager 108 sends a command to each storage drive 104 of the selected subset to provision a management drive volume on the storage drive 104 (306). Each storage drive 104 within the selected subset receives the command (308), and responsively provisions the requested drive volume (310). The SAN manager 108 then creates and mounts the management logical volume using the provisioned drive volumes on the selected storage drives 104 (312).

The SAN manager 108 creates the management logical volume using a topology. As an example, for a mirroring, or RAID-1, topology, each drive volume stores the same data. Therefore, the SAN manager 108 creates the management logical volume in interaction with a logical volume manager running on the same computing device to specify a logical volume that mirrors data over the two drive volumes. As another example, for a RAID-5 topology, each of at least three drive volumes may store data, parity information for the data, or both data and parity information. Therefore, the SAN manager 108 creates the management logical volume in interaction with the logical volume manager to specify a logical volume that achieves such a topology over the drive volumes. The storage drive 104 of each drive volume can be unaware that it is storing data in accordance with a particular type of topology in concert with other drives 104.

The SAN manager 108 stores the information regarding the storage drives 104 received in part 302 on the management logical volume (314). This means that in effect, the SAN manager 108 accesses the management drive volumes by which the management logical volume is implemented, by sending write requests to the storage drives 104 on which the management drive volumes have been provisioned. As such, the storage drives 104 of the subset receive the write requests, and store data in accordance with the I/O requests made by the SAN manager 108 (316). The SAN manager 108 in this respect both generates the I/O requests for the management logical volume, and fulfills the I/O requests by directing them to the appropriate management drive volumes by which the management logical volume is implemented. As new storage drives 104 are added to the SAN system 100, and as existing storage drives 104 are removed from the SAN system 100, the SAN manager updates the information stored on the management logical volume.

The SAN manager 108 can share information regarding the management logical volume with the standby SAN manager 110 (318). This information can include the identification of management logical volume, the identification of the management drive volumes by which the management logical volume is implemented and the storage drives 104 on which these drive volumes have been provisioned, and the topology by which the management logical volume is implemented using the management drive volumes. The standby SAN manager 110 can thus also mount the management logical volume using the provisioned management drive volumes (320). Therefore, should the SAN manager 108 fail, the standby SAN manager 110 can upon detection of this failure take over for the SAN manager 108, and have access to the information stored on the management logical volume to continue operation of the SAN system 100.

Figure 4:
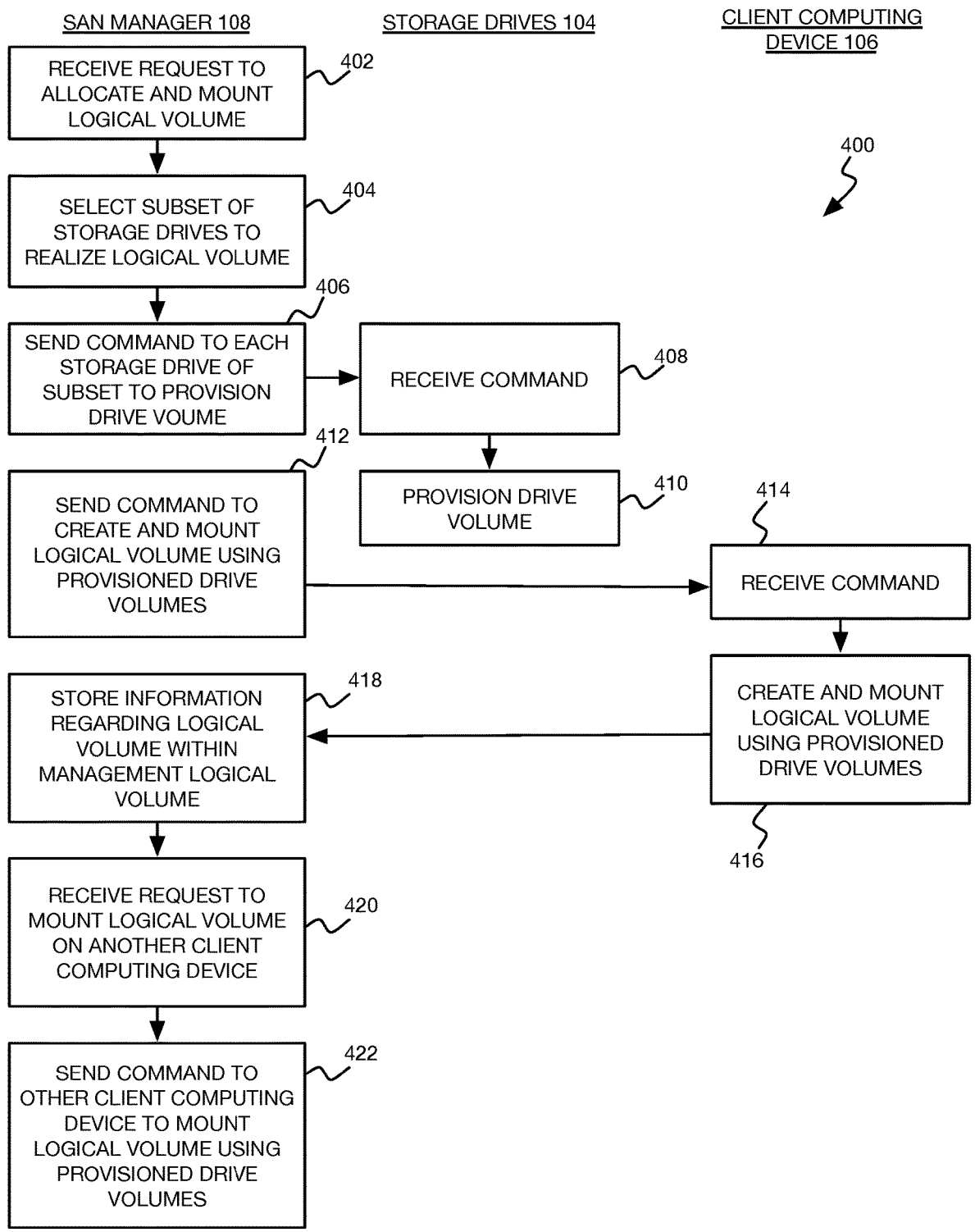
FIG. 4 is a flowchart of an example method to commission a logical drive volume on a client computing device of a distributed SAN system using drive volumes on storage drives of the distributed SAN system.

FIG. 4 shows an example method 400 for commissioning a logical volume on a client computing device 106 using drive volumes on storage drives 104 within the SAN system 100. The method 400 is divided into three columns corresponding to the SAN manager 108, the storage drives 104, and the client computing device 106. The SAN manager 108 performs the parts of the method 400 in the left column; the storage drives 104 perform the parts of the method 400 in the middle column; and the client computing device 106 (more specifically the SAN software agent 128 thereof, in conjunction with the logical volume manager 130 thereof) performs the parts of the method 400 in the right column.

The SAN manager 108 receives from an administrator a request to allocate and mount a logical volume on the client computing device 106 (402). As described above in relation to part 302, the SAN manager 108 may expose a web interface by which an administrator logs onto the SAN manager 108, the SAN manager 108 may provide for direct local control by the administrator, or the SAN manager 108 may receive the request in a different manner. The request specifies at least characteristics regarding the logical volume to be created, such as the client computing device 106 on which the logical volume is to be created and the size of the logical volume.

The request may in varying degrees of specificity describe other characteristics of the logical volume. For instance, the request may specify the performance characteristics of the logical volume and the type of redundancy by which the logical volume is to be implemented, or the request may specify just quality-of-service (QoS) characteristics of the logical volume, which can be mapped to performance characteristics and redundancy type. The request in general can thus directly or indirectly specify the higher-level storage functionality of the logical volume, including RAID functionality, compression functionality, encryption functionality, mirroring functionality, snapshot functionality, deduplication functionality, and so on.

The SAN manager 108 selects a subset of the storage drives 104 to realize the requested logical volume on the client computing device 106 (404). The storage drives may be specified within the request. In another implementation, the SAN manager 108 may itself select a subset of the storage drives 104 that can implement the requested logical volume in satisfaction of the specified characteristics of the logical volume. The SAN manager 108 can make this selection because it stores information regarding the storage drives 104 within the management logical volume, as described above.

The SAN manager 108 sends a command to each storage drive 104 of the selected subset to provision a drive volume on the storage drive 104 (406). Each storage drive 104 within the selected subset receives the command (408), and responsively provisions the requested drive volume (410). The SAN manager 108 then sends a command to the client computing device 106 to create and mount the logical volume with the requested characteristics using the drive volumes that have been provide on the storage drives of the selected subset (412). The client computing device 106 receives the command (414), and responsively creates and mounts the logical volume with the requested characteristics using the provisioned drive volumes on the storage drives 104 of the selected subset (416).

In creating and mounting the logical volume, the client computing device 106 ensures that the logical volumes has the desired higher-level storage functionality specified within the request. For instance, if RAID functionality is specified, the RAID is implemented by the client computing device 106 using a software RAID approach. That is, the client computing device 106 implements RAID in relation to the specified drive volumes on the storage drives 104, not the SAN manager 108 or any of the storage drives 104 on which the drive volumes have been provisioned.

The SAN manager stores information regarding the logical volume within the management logical volume that was previously allocated (418). This information includes information regarding the client computing device 106 on which the logical volume has been created and mounted, such as its address on the fabric 102, its host name, the operating system running on the client computing device 106, and so on. The information includes a description the logical volume as well, such as the identity of the drive volumes used to form the logical volume, the higher-level storage functionality that the logical volume realizes, path names of device entries associated with the logical volume on the client computing device 106, and path names at which the logical volume is currently mounted on the client computing device 106, and so on. Other such information can include a description of a replication target, if the logical volume is being replicated to remote storage.

The same logical volume may be mounted on more than one client computing device 106. As such, the SAN manager 108 may also receive from the administrator a request to mount the logical volume on another client computing device 106 (420). In response, the SAN manager 108 sends a command to this latter client computing device 106, instructing it to mount the logical volume using the provisioned drive volumes on the storage drives 104 of the selected subset (422).

In the method 400, the SAN manager 108 is responsible for sending commands to the storage drives 104 of the selected subset to provision drive volumes for the requested logical volume, not the client computing device 106 at which the logical volume is to be allocated. Likewise, the SAN manager 108 is responsible for sending a command to the client computing device 106 to allocate and mount the logical volume using the newly provisioned drive volumes on the storage drives 104. The storage drives 104 may be unaware that they participate with one another to realize the logical volume in question.

FIG. 5 shows an example method 500 for decommissioning a logical volume from a client computing device 106 that uses drive volumes on storage drives 104 within the SAN system 100. The method 500 is divided into three columns corresponding to the SAN manager 108, the storage drives 104 on which the drive volumes that realize the logical volume have been provisioned, and the client computing device 106 on which the logical volume has been allocated and mounted. The SAN manager 108 performs the parts of the method 500 in the left column; the storage drives 104 perform the parts of the method 500 in the middle column; and the client computing device 106 (more specifically the SAN software agent 128 thereof, in conjunction with the logical volume manager 130 thereof) performs the parts of the method 500 in the right column.

The SAN manager 108 receives from an administrator a request to demount and deallocate the logical volume from the client computing device 106 (502). As described above in relation to part 502, the SAN manager 108 may expose a web interface by which an administrator logs onto the SAN manager 108, the SAN manager 108 may provide for direct local control by the administrator, or the SAN manager 108 may receive the request in a different manner. The request specifies the identification of the logical volume, and identification of the client computing device 106. The request may not specify the drive volumes, for instance, which implement the logical volume.

The SAN manager 108 responsively sends a command to the client computing device 106 to demount and deallocate the logical volume specified in the request (504). The client computing device 106 thus receives this command (506). In response, the client computing device 106 demounts and deallocates the logical volume from the computing device 106 (508).

It is noted that demounting and deallocation of the logical volume from the computing device 106 does not remove the drive volumes that implement the logical volume from the storage drives 104 in question. This is because, first, the client computing device 106 does not manage the drive volumes on the storage drives 104; rather, the SAN manager 108 does. This is also because, second, other client computing devices 106 may still be using the logical volume, since more than one client computing device 106 can share the same logical volume.

Therefore, the SAN manager 108 then determines whether any other client computing device 106 is still using the logical volume (510). As has been noted, the same logical volume may be mounted at more than one client computing device 106. The SAN manager 108 can make this determination because it stores information regarding the logical volumes and the client computing devices 106 within the management logical volume, as described above.

If no other client computing device 106 is still using the logical volume, then the SAN manager 108 sends a command to each storage drive 108 of the subset of storage drives 108 that has provisioned a drive volume which was used to implement the logical volume that is no longer being used by any client computing device 106 (512). Each such storage drive 108 receives this command (514). In response, each of these storage drives 108 deprovisions its corresponding drive volume (516). Therefore, the physical storage space of each storage drive 108 that was used by the drive volume is now freed up and available for provisioning other drive volumes.

The SAN manager 108 updates information regarding the logical volume within the management logical volume (518). For instance, the SAN manager 108 can indicate that the client computing device 106 that demounted and deallocated the logical volume in part 508 is no longer using the logical volume in question. If no client computing device 106 is now using this logical volume, the SAN manager 108 can remove information regarding the logical volume from the management logical volume, as well as information regarding the drive volumes on the storage drives 108 that implemented this logical volume.

The methods 400 and 500 thus provide for the commissioning and decommissioning of logical volumes on client computing devices 106 using the drive volumes on storage drives 104. Each logical volume is made up of one or more drive volumes on one or more storage drives 104. Each drive volume of each storage drive 104 implements partially or completely just one logical volume. A logical volume can be shared by more than one client computing device 106. A storage drive 104 can provision multiple drive volumes.

FIG. 6 shows an example method 600 for using a logical volume on a client computing device 106 that has been implemented via drive volumes on storage drives 104 within the SAN system 100. The method 600 is divided into two columns corresponding to the client computing device 106 on which the logical volume has been allocated and mounted and the storage drives 106 on which the drive volumes that realize the logical volume have been provisioned. The client computing device 106 (more specifically the SAN software agent 128 thereof, in conjunction with the logical volume manager 130 thereof) performs the parts of the method 600 in the left column; and the storage drives 104 perform the parts of the method 600 in the right column.

The client computing device 106 receives an I/O request generated within the client computing device 106 itself that pertains to the logical volume (602). For example, an application program running on the client computing device 106 may generate the I/O request. The I/O request may be a request to read data from the logical volume, write data to the logical volume, or update data already stored on the logical volume. The latter request is a type of write request.

The client computing device 106 accesses the drive volumes on the storage drives 104 for the logical volume in satisfaction of the I/O request. In accessing the drive volumes, the client computing device 106 realizes any higher-level storage functionality that has been specified for the logical volume in question. For instance, the client computing device 106 can perform a software RAID approach when writing data to the logical volume if such higher-level storage functionality has been specified.

Therefore, the client computing device 106 can determine the drive volume(s) of the logical volume to access to satisfy the I/O request (604). If the I/O request is a read request, not all the drive volumes making up the logical volume may have to be accessed; rather, just the drive volume that stores the data being requested may have to be accessed. If the I/O request is a write request, similarly, not all the drive volumes making up the logical volume may have to be accessed. For example, for a software RAID approach, just the drive volume storing the data and the drive volume storing parity information for this data may have to be accessed.

The client computing device 106 thus sends drive volume requests to the storage drives having the drive volumes to be accessed to satisfy the I/O request (606). Each such storage drive receives the request (608), accesses data on its drive volume pursuant to the request (610), and sends a response (612). For instance, for a read request, a storage drive may retrieve the requested data from the drive volume and return the requested data to the client computing device 106. For a write request, a storage drive may write the requested data to the drive volume and return a confirmation that the requested data has been written.

The client computing device 106 receives the drive volume responses from the storage drives (614), and sends a response to the application program or other program within the client computing device 106 that generated the I/O request (616). In usage of a logical drive within the SAN system 100, therefore, the SAN manager 108 does not participate. Rather, the client computing device 106 itself directly interacts with the storage drives 104.

FIG. 7 shows an example method 700 for maintaining the SAN system 100 during usage by the client computing devices 106 of FIG. 1. The method 700 is divided into three columns corresponding to the SAN manager 108, the storage drives 104, and the client computing devices 106. The SAN manager 108 performs the parts of the method 700 in the left column; the storage drives 104 perform the parts of the method 700 in the middle column; and the client computing devices 106 (more specifically the SAN software agents 128 thereof, in conjunction with the logical volume managers 130 thereof) perform the parts of the method 700 in the right column.

The SAN manager 108 periodically requests storage drive status information from each storage drive 104 (702). Each storage drive 104 thus receives this request (704), and sends the requested status information back to the SAN manager 108 in response (706). For instance, the status information can include the health status of each storage drive 104, as well as the free physical storage capacity thereof. The SAN manager 108 receives and stores this information within the management logical volume that has been described (708).

The SAN manager 108 periodically requests storage drive status information from the storage drives 104 so it maintains up-to-date information regarding the storage drives 104 within the SAN system 100. The SAN manager 108 does not participate in the data path 206 of FIG. 2 that has been described, and as such has to periodically request such information from the storage drives 104. This information can be used when selecting on which storage drives 104 to provision new drive volumes, for instance, for implementing newly requested logical volumes.

The SAN manager 108 similarly periodically requests drive volume status information from each client computing device 106 (710). That is, the SAN manager 108 requests status information regarding the drive volumes that make up the logical volumes allocated and mounted on each client computing device 106 (712). Each client computing device 106 receives this request (712), and sends the requested status information back to the SAN manager 108 in response (714). The status information can include the latency and throughput, for instance, that a client computing device 106 is experiencing in relation to each drive volume that is implementing a logical volume allocated and mounted on the client computing device 106. The SAN manager 108 receives and stores this information within the management logical volume as well (716).

The SAN manager 108 periodically requests drive volume status information from the client computing devices 106 also to maintain up-to-date information regarding the drive volumes themselves within the SAN system 100. As noted above, the SAN manager 108 does not participate in the data path 206 of FIG. 2 that has been described, and as such has to periodically request such information from the client computing devices 106. This information can also be used when selecting on which storage drives 104 to provision new drive volumes, as well as to determine whether drive volumes should be migrated among the storage drives 104 to ensure that QoS requirements of logical volumes are being satisfied. The client computing devices 106 themselves, for example, cannot move drive volumes among the storage drives 104; just the SAN manager 108 can.

The techniques that have been disclosed herein therefore provide for a novel distributed SAN. Implementation effort and costs can be reduced because existing software on the client computing devices and on the storage drives may be minimally modified. Less hardware resources are employed compared to a traditional SAN approach that requires one or more standalone controllers by which the client computing devices access the storage drives; indeed, even the SAN manager of the techniques described herein can be implemented at a client computing device or at a storage drive. The strategies described herein provide for greater scalability, because the storage controller performance bottleneck is removed, and because higher-level storage functionality is realized at the SAN agent level, by the client computing devices themselves.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage drives. It is manifestly intended that this invention be limited only by the claims and equivalents thereof

We claim:
1. A method comprising:
receiving, at a storage area network ("SAN") manager, a request to allocate and mount a logical volume on a client computing device connected to a fabric, the SAN manager connected to the fabric;

in response to receiving the request, selecting, by the SAN manager, a storage drive of a plurality of storage drives connected to the fabric and sending a first command to the selected storage drive to provision a drive volume on the selected storage drive, the plurality of storage drives comprising fabric-attachable storage drives; and sending, by the SAN manager, a second command to a SAN software agent of the client computing device and instructing the SAN software agent to create and mount the logical volume using the drive volume on the selected storage drive, wherein the SAN manager manages the logical volume without handling data transfer between the client computing device and the selected storage drive.

2. The method of claim 1, further comprising:

receiving, at the SAN manager, a second request for a second client computing device connected to the fabric to mount the logical volume; and in response to receiving the second request, sending a command to the second client computing device instructing the second client computing device to mount the logical volume that uses the drive volume on the selected storage drive.

3. The method of claim 1, wherein:

selecting the storage drive of the plurality of fabric-attachable storage drives comprises selecting two or more of the plurality of storage drives, the first command to provision the drive volume on the selected storage drive comprises a command to provision a drive volume on each storage drive of the selected two or more storage drives;

and the second command to the client computing device instructing the client computing device to create and mount the logical volume using the drive volume on the selected storage drive comprises a command to create and mount the logical volume using the drive volume on each of the storage drives of the selected two or more of the plurality of storage drives.

4. The method of claim 1, further comprising managing, by the SAN manager, the drive volume by commissioning the drive volume on the selected storage drive and by decommissioning the drive volume on the selected storage drive, and wherein the selected storage drive is configured to operate the drive volume by provisioning the drive volume on the selected storage drive after commissioning by the SAN manager and by deprovisioning the drive volume from the selected storage drive after decommissioning by the SAN manager.

5. The method of claim 1, further comprising managing, by the SAN manager, the logical volume by directing the SAN software agent running on the client computing device to commission the logical volume on the client computing device using the drive volume on the selected storage drive and to decommission the logical volume from the computing device, wherein the SAN software agent handles data transfer between the client computing device and the selected storage drive.

6. The method of claim 1, wherein the selected storage drive of the plurality of storage drives is configured to operate its drive volume and is not configured to operate any other, different drive volume of any other storage drive of the plurality of storage drives.

7. The method of claim 1, wherein the SAN manager runs on one of:

a computing device separate from the client computing device;

the client computing device; and one of the plurality of storage drives.

8. A non-transitory computer readable storage medium storing program code of a storage area network ("SAN") manager, the program code of the SAN manager executable by a processor of a computing device to perform operations comprising:

receiving, at the SAN manager, a request to allocate and mount a logical volume on a client computing device connected to a fabric, the SAN manager connected to the fabric;

in response to receiving the request, selecting, by the SAN manager, a storage drive of a plurality of storage drives connected to the fabric and sending a first command to the selected storage drive to provision a drive volume on the selected storage drive, the plurality of storage drives comprising fabric-attachable storage drives; and sending, by the SAN manager, a second command to a SAN software agent on the client computing device instructing SAN software agent on the client computing device to create and mount the logical volume using the drive volume on the selected storage drive, wherein the SAN manager manages the logical volume without handling data transfer between the client computing device and the selected storage drive.

9. The non-transitory computer readable storage medium of claim 8, further comprising program code in the SAN manager configured to:

receive, at the SAN manager, a second request for a second client computing device connected to the fabric to mount the logical volume;

and in response to receiving the second request, send a command to the second client computing device instructing the second client computing device to mount the logical volume that uses the drive volume on the selected storage drive.

10. The non-transitory computer readable storage medium of claim 8, wherein:

selecting the storage drive of the plurality of fabric-attachable storage drives comprises selecting two or more a subset of the plurality of storage drives, the first command to provision the drive volume on the selected storage drive comprises a command to provision a drive volume on each storage drive of the selected two or more storage drives;

and the second command to the client computing device instructing the client computing device to create and mount the logical volume using the drive volume on the selected storage drive comprises a command to create and mount the logical volume using the drive volume on each of the storage drives of the selected two or more of the plurality of storage drives.

11. The non-transitory computer readable storage medium of claim 8, further comprising program code in the SAN manager configured to manage, by the SAN manager, the drive volume by commissioning the drive volume on the selected storage drive and by decommissioning the drive volume on the selected storage drive, and wherein the selected storage drive is configured to operate the drive volume by provisioning the drive volume on the selected storage drive after commissioning by the SAN manager and by deprovisioning the drive volume from the selected storage drive after decommissioning by the SAN manager.

12. The non-transitory computer readable storage medium of claim 8, further comprising program code in the SAN manager configured to manage, by the SAN manager, the logical volume by directing the SAN software agent running on the client computing device to commission the logical volume on the client computing device using the drive volume on the selected storage drive and to decommission the logical volume from the computing device, wherein the SAN software agent handles data transfer between the client computing device and the selected storage drive.

13. The non-transitory computer readable storage medium of claim 8, wherein program code of the SAN manager runs on one of:
a computing device separate from the client computing device;
the client computing device;
and one of the plurality of storage drives.

14. An apparatus comprising:
a processor;
a memory that stores code executable by the processor to:
receive, at a storage area network ("SAN") manager, a request to allocate and mount a logical volume on a client computing device connected to a fabric, the SAN manager connected to the fabric;
in response to receiving the request, select, by the SAN manager, a storage drive of a plurality of storage drives connected to the fabric and sending a first command to the selected storage drive to provision a drive volume on the selected storage drive, the plurality of storage drives comprising fabric-attachable storage drives; and
send, by the SAN manager, a second command to a SAN software agent on the client computing device instructing the SAN software agent on the client computing device to create and mount the logical volume using the drive volume on the selected storage drive,
wherein the SAN manager manages the logical volume without handling data transfer between the client computing device and the selected storage drive.

15. The apparatus of claim 14, further comprising:
receiving, at the SAN manager, a second request for a second client computing device connected to the fabric to mount the logical volume; and
in response to receiving the second request, sending a command to the second client computing device instructing the second client computing device to mount the logical volume that uses the drive volume on the selected storage drive.

16. The apparatus of claim 14, wherein:
selecting the storage drive of the plurality of fabric-attachable storage drives comprises selecting two or more of the plurality of storage drives,
the first command to provision the drive volume on the selected storage drive comprises a command to provision a drive volume on each storage drive of the selected two or more storage drives;
and the second command to the client computing device instructing the client computing device to create and mount the logical volume using the drive volume on the selected storage drive comprises a command to create and mount the logical volume using the drive volume on each of the storage drives of the selected two or more of the plurality of storage drives.

17. The apparatus of claim 14, further comprising managing, by the SAN manager, the drive volume by commissioning the drive volume on the selected storage drive and by decommissioning the drive volume on the selected storage drive, and wherein the selected storage drive is configured to operate the drive volume by provisioning the drive volume on the selected storage drive after commissioning by the SAN manager and by deprovisioning the drive volume from the selected storage drive after decommissioning by the SAN manager.

18. The apparatus of claim 14, further comprising managing, by the SAN manager, the logical volume by directing the SAN software agent running on the client computing device to commission the logical volume on the client computing device using the drive volume on the selected storage drive and to decommission the logical volume from the computing device, wherein the SAN software agent handles data transfer between the client computing device and the selected storage drive.

19. The apparatus of claim 14, wherein the selected storage drive of the plurality of storage drives is configured to operate its drive volume and is not configured to operate any other, different drive volume of any other storage drive of the plurality of storage drives.

20. The apparatus of claim 14, wherein the SAN manager runs on one of:
a computing device separate from the client computing device;
the client computing device; and
one of the plurality of storage drives.

* * * * *